US012670237B2

(12) United States Patent
Paladino et al.

(10) Patent No.: US 12,670,237 B2
(45) Date of Patent: Jun. 30, 2026

(54) DYNAMIC REALLOCATION OF COMPUTING RESOURCES BASED ON MONITORED USAGE ACTIVITIES OF CLIENT SYSTEMS

(71) Applicant: Flexera Software LLC, Itasca, IL (US)

(72) Inventors: Mark Paladino, San Jose, CA (US); Chris Hughes, San Jose, CA (US); Alex Chow, San Jose, CA (US); Alexandru Macovei, San Jose, CA (US); Elvira Kan, San Jose, CA (US)

(73) Assignee: FLEXERA SOFTWARE LLC, Itasca, IL (US)

( * ) Notice: Subject to any disclaimer, the term of this patent is extended or adjusted under 35 U.S.C. 154(b) by 651 days.

(21) Appl. No.: 15/951,022

(22) Filed: Apr. 11, 2018

(65) Prior Publication Data

US 2019/0318064 A1    Oct. 17, 2019

Related U.S. Application Data

(63) Continuation of application No. 14/703,808, filed on May 4, 2015, now abandoned.

(51) Int. Cl.
*G06F 21/10*       (2013.01)
*G06F 11/30*       (2006.01)
*G06F 11/34*       (2006.01)

(52) U.S. Cl.
CPC ........ *G06F 21/105* (2013.01); *G06F 11/3051* (2013.01); *G06F 11/3442* (2013.01)

(58) Field of Classification Search
CPC ....... H04L 63/10; H04L 67/22; G06F 9/5077; G06F 21/105; G06Q 50/18
See application file for complete search history.

(56) References Cited

U.S. PATENT DOCUMENTS 7,406,688 B2    7/2008  Shibayama et al.
7,716,348 B1 *  5/2010  Redding ............... G06F 21/105
                                                           709/229

(Continued)

FOREIGN PATENT DOCUMENTS

EP            3952383 A1 *   2/2022    ........ H04W 72/0453

OTHER PUBLICATIONS

Mochon; The Clock Proxy Auction for Allocating Radio Spectrum Licenses, Computational economics, Apr. 2011, vol. 37 (4), p. 411-431.*

*Primary Examiner* — Ilse I Immanuel
(74) *Attorney, Agent, or Firm* — BARNES & THORNBURG LLP

(57) ABSTRACT

The disclosed embodiments include a computer system that can monitor usage activity of software program(s) by client systems, and ascertain an existing ratio between a first group of resources of a first type and a second group of resources of a second type collectively allocated to the client systems. The first and second types define different amounts of functionality enabled by the software program. The system can be further caused to determine first and second recommended counts for the first and second groups of resources based on the monitored usage activity and an expected ratio, and cause adjustment of an allocation of resource(s) from the first and/or second groups of resources in accordance with the first and second recommended counts such that the adjusted allocation tracks the monitored usage activity while conforming to the expected ratio.

9 Claims, 11 Drawing Sheets

(56)                    References Cited

U.S. PATENT DOCUMENTS

| | | | |
|---|---|---|---|
| 9,122,676 B2 | 9/2015 | Chen et al. | |
| 2001/0028603 A1* | 10/2001 | Shimazu | G06F 16/242 |
| | | | 368/10 |
| 2004/0088730 A1* | 5/2004 | Gopalan | H04N 21/8549 |
| | | | 348/E7.054 |
| 2010/0333212 A1* | 12/2010 | Carpenter | H04L 63/0853 |
| | | | 726/29 |
| 2011/0066721 A1* | 3/2011 | Shinomiya | G06F 21/10 |
| | | | 709/224 |
| 2012/0232520 A1* | 9/2012 | Sloan | G06F 19/00 |
| | | | 604/504 |

* cited by examiner

500

| | |
|---|---|
| Optimal license count | The count of licenses without any licensing constraints being taken into consideration. |
| Recommended license count | The count of licenses with licensing constraints being taken into consideration. |

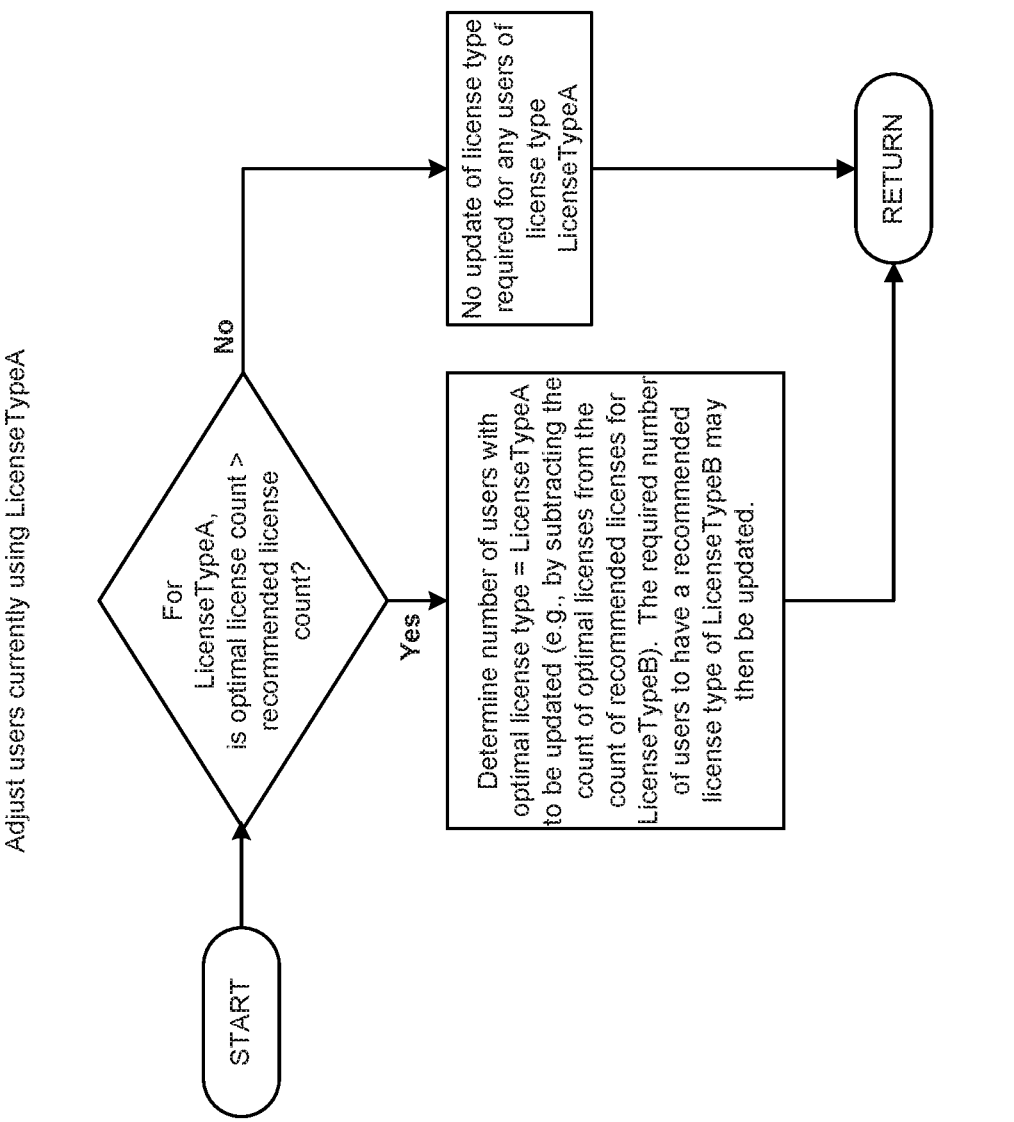

Adjust users currently using LicenseTypeA

435

START

For LicenseTypeA, is optimal license count > recommended license count?

No

No update of license type required for any users of license type LicenseTypeA

Yes

Determine number of users with optimal license type = LicenseTypeA to be updated (e.g., by subtracting the count of optimal licenses from the count of recommended licenses for LicenseTypeB). The required number of users to have a recommended license type of LicenseTypeB may then be updated.

RETURN

*FIG. 9*

Figure 10:
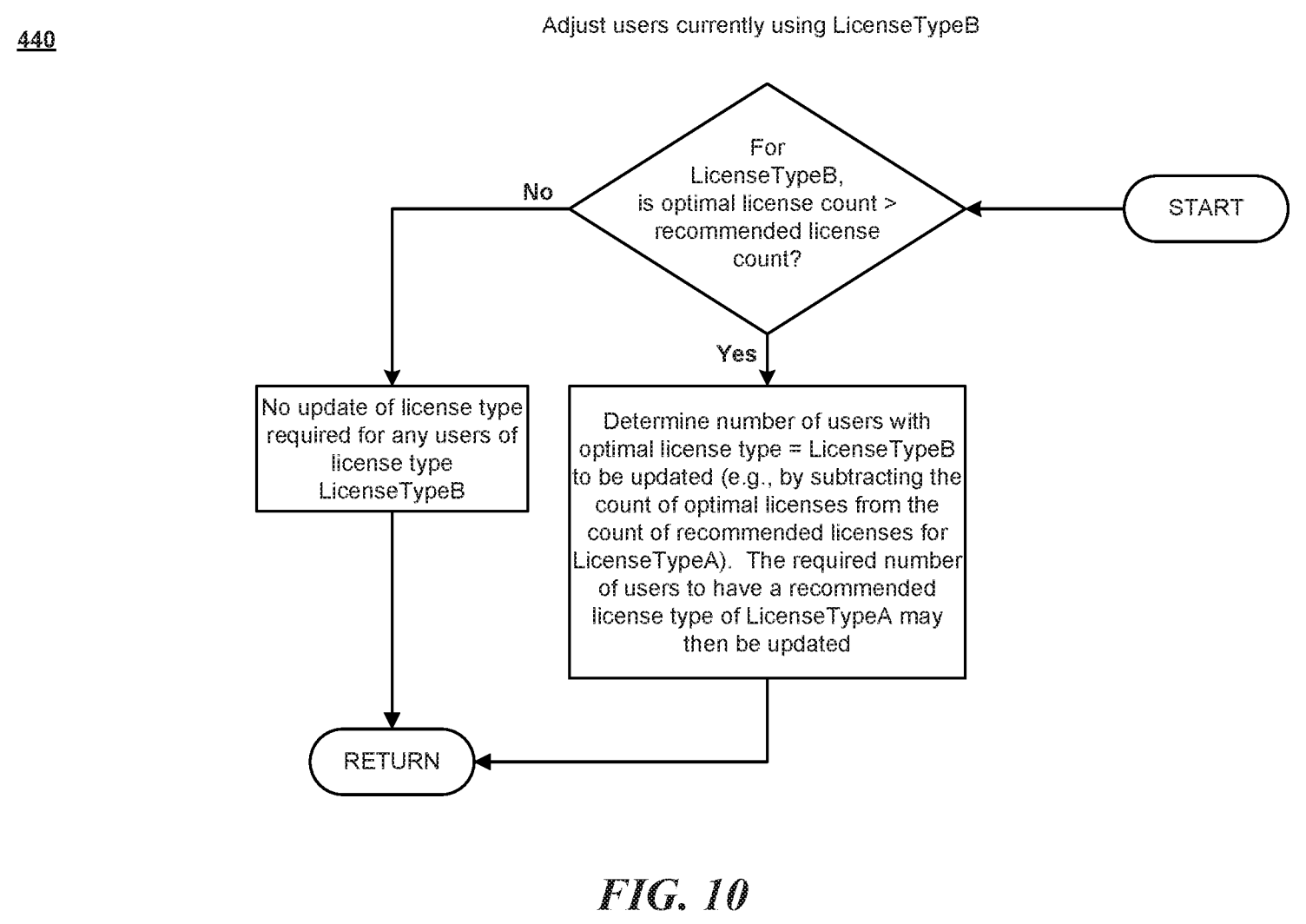

Adjust users currently using LicenseTypeB

START

For LicenseTypeB, is optimal license count > recommended license count?

Yes

Determine number of users with optimal license type = LicenseTypeB to be updated (e.g., by subtracting the count of optimal licenses from the count of recommended licenses for LicenseTypeA). The required number of users to have a recommended license type of LicenseTypeA may then be updated No No update of license type required for any users of license type LicenseTypeB

RETURN

DYNAMIC REALLOCATION OF COMPUTING RESOURCES BASED ON MONITORED USAGE ACTIVITIES OF CLIENT SYSTEMS

CROSS-REFERENCE TO RELATED APPLICATIONS

This application is a continuation application of U.S. patent application Ser. No. 14/703,808, titled "SOFTWARE LICENSE RATIO MONITORING AND LICENSE REUSE OPTIMIZATION" and filed May 4, 2015, which is incorporated by reference herein in its entirety.

TECHNICAL FIELD

Various of the present embodiments relate to software/firmware/hardware systems for managing license deployments.

BACKGROUND

The software ecosystem has developed a myriad of different licensing and implementation environments. Some licensors impose detailed restrictions on their licensees' behavior, limiting the relationships between different active software licenses used by the licensee. Given the diversity of businesses which license such software, businesses are rarely able to comply with such licenses in an optimal manner. Resources are often unavailable, low priority tasks receive excessive access while high priority tasks are underserved, users accustomed to one level of availability find themselves subject to various inconveniences, etc. Additionally, licensees may have differently sized user bases and may employ the software for very different tasks. Thus, a benign restriction in one licensee's context may impose an onerous burden for another licensee.

Accordingly, there is a need for more effective compliance monitoring and enforcement systems. These systems must be strict enough to honor the required licensing terms, but flexible enough to adapt to the particular circumstances of a given licensee's organization.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIG. 6 depicts example entities as may be applied in some embodiments;

FIG. 9 is a flow diagram depicting various steps in a license update process (e.g., as may occur in block 435 in some embodiments) as may be implemented in some embodiments;

FIG. 10 is a flow diagram depicting various steps in a license update process (e.g., as may occur in block 440 in some embodiments) as may be implemented in some embodiments.

Figure 1:
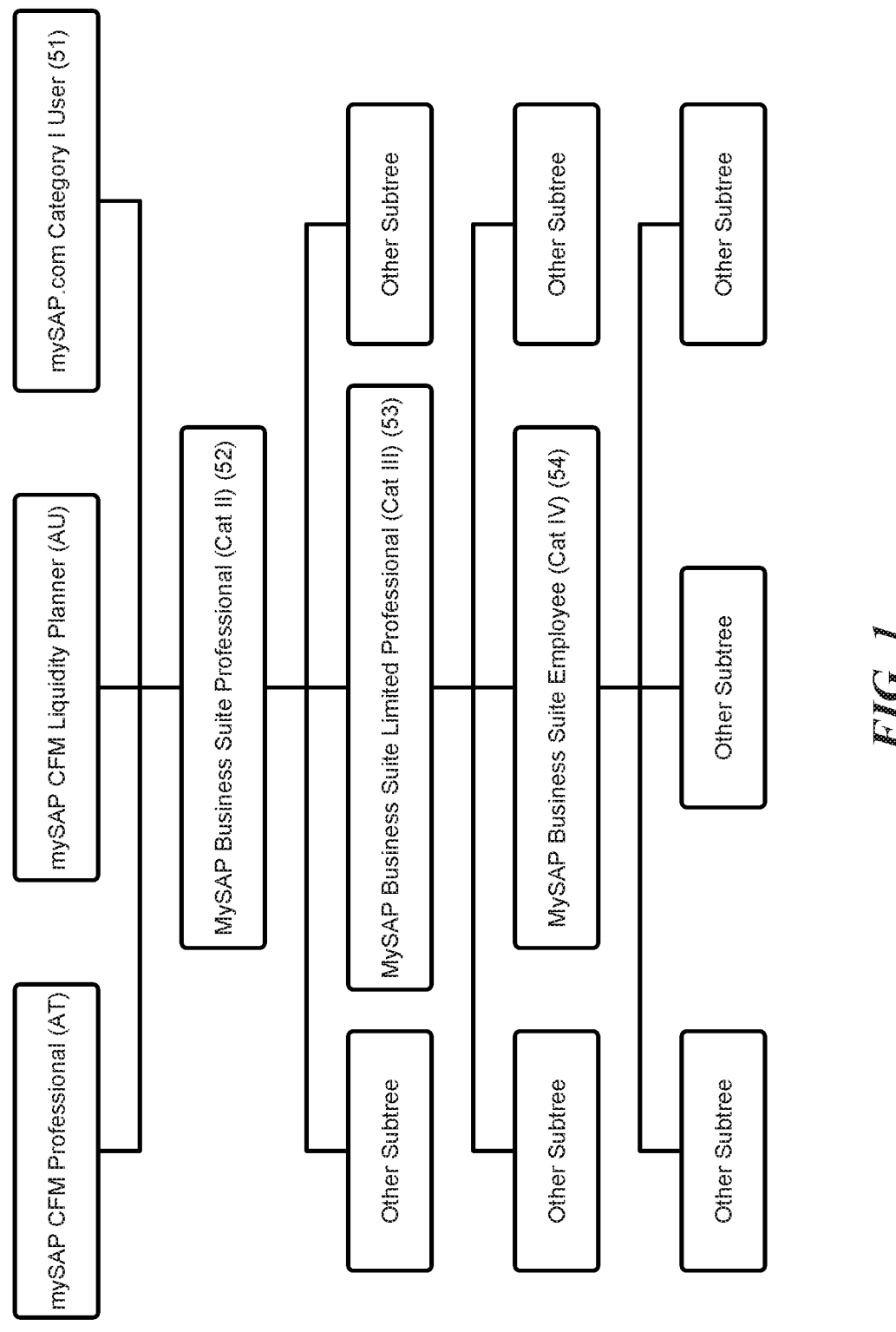
FIG. 1 is an example license hierarchy as may apply in some embodiments.

While the flow and sequence diagrams presented herein show an organization designed to make them more comprehensible by a human reader, those skilled in the art will appreciate that actual data structures used to store this information may differ from what is shown, in that they, for example, may be organized in a different manner; may contain more or less information than shown; may be compressed and/or encrypted; etc.

The headings provided herein are for convenience only and do not necessarily affect the scope or meaning of the embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments.

DETAILED DESCRIPTION

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Overview

Many organizations rely heavily upon disparate collections of licensed software associated with various licensing terms and conditions. For example, SAP SE® provides various software solutions under different licensing terms. Organizations using SAP® software (or a similar organization) may have contracts stipulating a "license ratio" condition. The "license ratio" is a minimum ratio between (but not limited to) two license types. For example, given hypothetical license type A and hypothetical license type B, an A/B ratio of 1/4 may require that there be at least four times as many B licenses as A licenses in effect at any time during the agreement. Due to this contract requirement, the organization may be responsible for ensuring that the number of licenses that have been purchased meets the minimum ratio. In some agreements, each time additional licenses are purchased, the purchaser must ensure that the ratio is maintained. Thus, the terms may reflect an ongoing obligation rather than just an agreement regarding the initial purchases of the license (though in some embodiments, only an initial requirement may be imposed). In some contracts, the ratio is between groups of licenses, e.g., the ratio of one license to a group of two or more license, or the ratio of a group of two or more licenses to another group of two or more licenses. In these instances, each active instance of a license may contribute to the total for the group.

To facilitate discussion in this document, a license ratio requirement is assumed to exist between two hypothetical license types: "LicenseTypeA" and "LicenseTypeB". A hypothetical contract may state that there exists a minimum ratio between the numbers of licenses purchased of each license type. For example of the total licenses of type LicenseTypeA and LicenseTypeB owned by an organization, the agreement may require that 40% of the active software instances (e.g., a number of processes across a computer network) be under LicenseTypeA and 60% must be under LicenseTypeB. It is further assumed in some instances that the license type that allows a user to access greater functionality within the licensing organization (e.g., SAP®) has a higher priority in the license type hierarchy and accordingly has the higher ratio percentage (e.g., LicenseTypeB would be higher than LicenseTypeA as it receives 60%). The license type hierarchy may be defined by the licensor (e.g., SAP®) and may represent the amount of functionality a user can access based on a specific license type. An example of a subset of the SAP license type hierarchy can be seen in FIG. 1. The exemplary blocks in FIG. 1 refer to the different license types available from the vendor. As shown in this example, the highest priority licenses are indicated at the top of the tree, with increasingly less prioritized licenses provided below. The licenses may be ordered in a total or partial ordering based upon their level in the tree. Accordingly, the ratio may require that fewer licenses lower in the tree be in effect when licenses higher in the tree are in effect (or vice versa in some circumstances).

Example System Topology Overview

Figure 2:
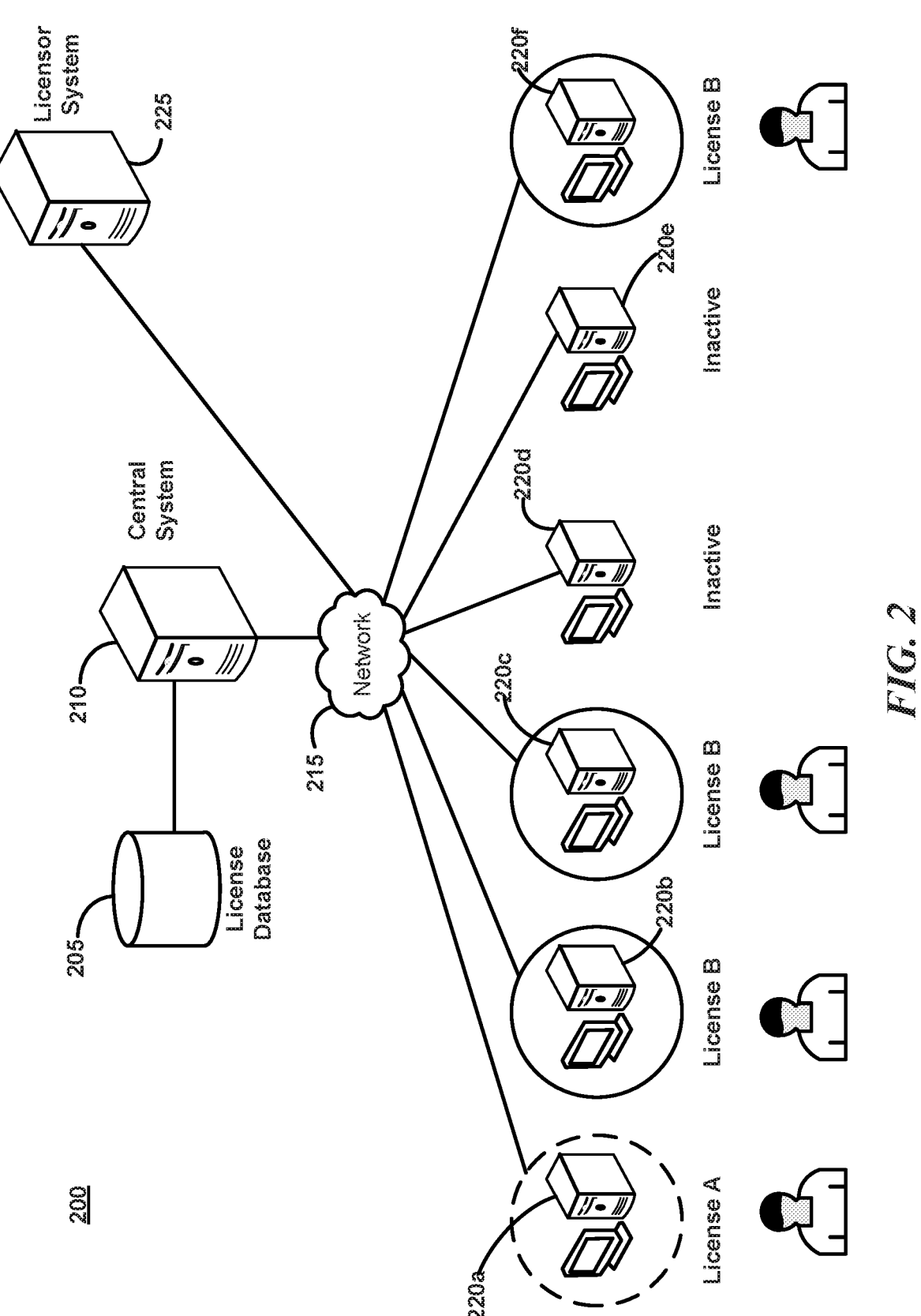
FIG. 2 is an example deployment system topology for optimizing license assignments as contemplated in some embodiments.

FIG. 2 is an example deployment system 200 topology for optimizing license assignments as contemplated in some embodiments. A central system 210, may run one or more monitoring programs which coordinate license assignments for client systems 220a-f across a computer network 215. A license database 205 may include information indicating terms of an agreement between a license provider and a licensee. For example, access to software and/or services from a licensor server system 225 may be predicated upon compliance with the conditions of the license agreement.

In this example, the agreement mandates a ratio of no more than ½ between Licenses A and B. At the depicted time, client systems 220a, 220b, 220c, and 220f may be in use while systems 220d and 220e are inactive (one will recognize that independent machines are depicted here for clarity, but that actual license terms may mandate a number of processes/threads running, regardless of whether they run on one or many machines). Thus, at present, it is acceptable for client system 220a to run License A, while systems 220b, 220c, and 220f run License B (presenting 1 active License A instance for 3 active License B instances, or a ratio of ⅓ which is <=1/2). However, if a new system is brought online, e.g., system 220d, it will not be able to instantiate a software or service under License A as doing so would exceed the mandated ratio (i.e., a ratio of ⅔ which is >1/2). If system 220d instead instantiates License B, a user subsequently beginning a session on system 220e may have the choice of using either License A or License B (as instantiating either would result in License A to License B ratios of ½ or ⅕ respectively, each of which are <=1/2). Complications can arise, however, when users close instances. For example, a user engaged in a session under License A may suddenly be required to transition to License B if a sufficient number of License B sessions are closed (some contracts may permit existing instances to continue so long as new instances are only created in compliance with the mandated ratio).

Accordingly, the central system 210, may coordinate licenses to optimize their compliant usage under the terms of the agreement. As discussed herein, the central system 210 may be integrated with the network such that license ratios are properly maintained in an effective and streamlined manner. Though the central system 210 is depicted here as a single, overarching device, one will recognize topologies wherein the central system 210 is distributed among client systems, shared among multiple devices, etc.

Figure 3:
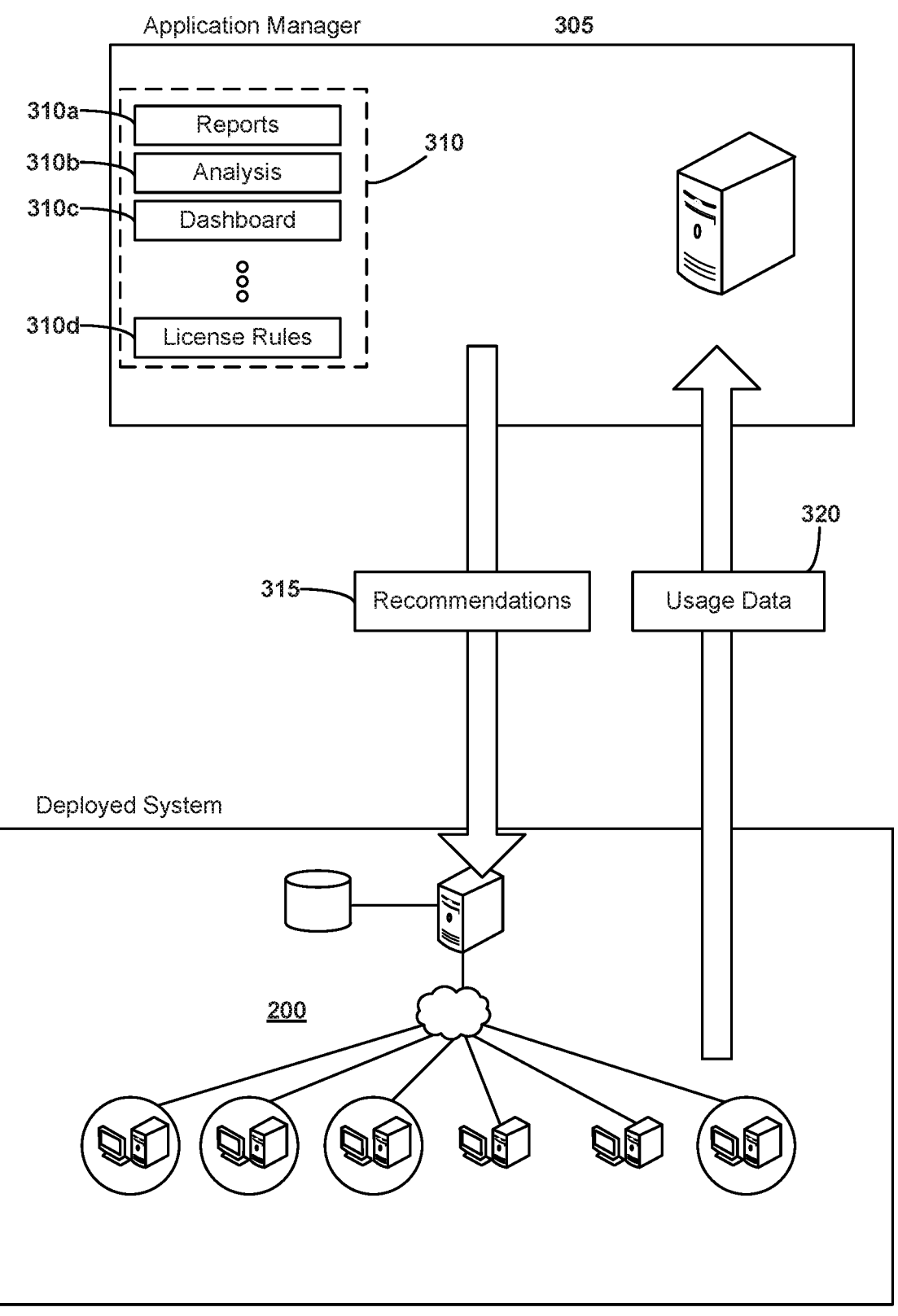
FIG. 3 is an example system topology for a manager system and deployment system optimizing license assignments as contemplated in some embodiments.

FIG. 3 is an example system topology for a manager system and deployment system optimizing license assignments as contemplated in some embodiments. A deployment system 200 such as the one previously described in FIG. 2 may communicate with an application manager 305 locally or remotely, e.g., across a network. The application manager 305 may include a corpus of information and tools 310, including, e.g., reports 310a, analysis results 310b, a user GUI dashboard 310c, licensing rules 310d, etc. Business rules at the application manager 305 may be used by the system to derive recommendations 315 from this information corpus. The deployment system 200 may report usage data 320 to the application manager 305 at various times, which may be used to supplement the corpus of information 310. Thus, the deployed system 200 may be managed by central system 210, but central system 210 may itself interact with an application manager 305 to optimize its behavior to a particular licensee's circumstances. In some embodiments, the central system 210 may incorporate, or contain, application manager 305.

Example Central System Operation Overview

Some computer system embodiments obtain an optimal license position for an organization by analyzing an organization's current license assignments and then comparing usage data against optimization rules defined by the organization (e.g., as specified in application manager 305 or central system 210). In this manner, the optimal license type for each user can be recommended or assigned. A license breach may occur when there aren't enough purchases of a license type to cover the necessary assignments of that license type (e.g., to meet the ratio requirement, 30 licenses must be in effect, but only 10 are available).

Various computer system embodiments include a mechanism for considering the existence of a license ratio within the user's contract. The system may calculate the optimal license position and remove as many license breaches as possible by re-using as many, if any, spare superior (higher priority) licenses as are available. This process may be independent of the initial license assignment recommendation. The process may activate or deactivate at any time during the calculation of a license position in some embodiments.

In some embodiments, the computer process begins with the calculation of the most optimal license position 405 based upon, e.g., the user consolidation, optimization and duplicate creation of user rules. The system may check if a license ratio has been defined and activated at block 410. If a ratio has not been defined, the system may move on to the block 445 and then 505 of possibly promoting users to spare superior (higher priority) licenses.

If a license ratio is defined and active at block 410, the system may then enforce the license beginning at block 415. The respective percentage values for each license type may be retrieved and stored at block 415 along with the optimal license count for both license types that have been calculated earlier in the process. The system may then calculate the recommended license counts for both license types of the license ratio at blocks 420 and 425 (as well as the other licenses if more than two licenses are being considered).

Figure 7:
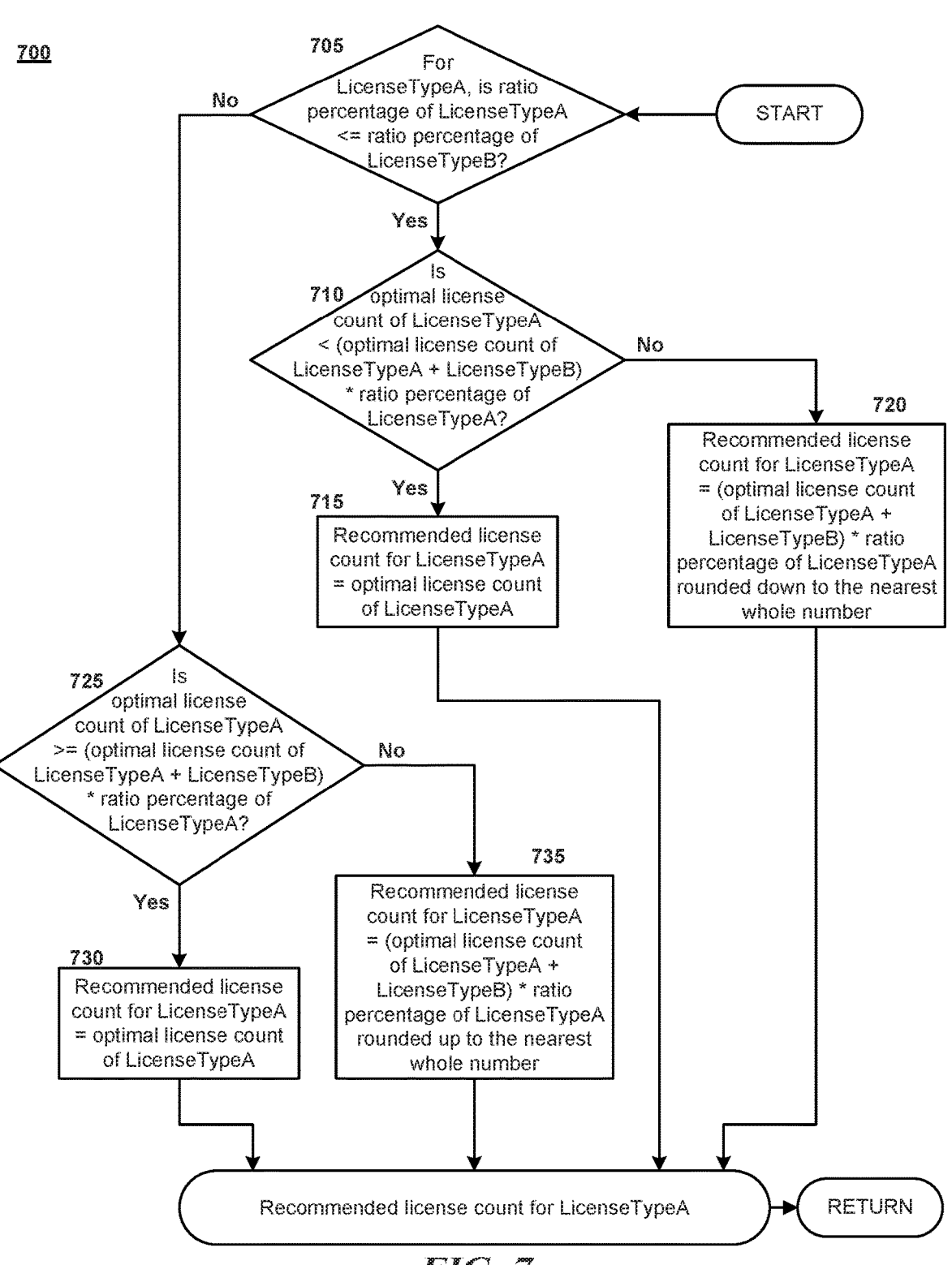
FIG. 7 is a flow diagram depicting various steps in a license recommendation process (e.g., as may occur in block 420 in some embodiments) as may be implemented in some embodiments.

FIG. 7 is a flow diagram depicting various steps in a license recommendation process (e.g., as may occur in block 420 in some embodiments) as may be implemented in some embodiments. At block 705, the recommended license count may be calculated by identifying the lower priority license type and then comparing that license count to determine whether the percentage value of this license type is less than or equal to the percentage value of the higher priority license type. If the lower priority license satisfies this condition, then the system may proceed to block 710.

If the optimal license count of the lower priority license type is less than the sum of both license types multiplied by the lower priority license type percentage value, then the recommended license count may be equal to the optimal license count for that license type at block 715. However if the optimal license count of the lower priority license type is greater than or equal to the sum of the both license types multiplied by the lower priority license type percentage value, then the recommended license count may be the sum of the both license types multiplied by the lower priority license type percentage value rounded down to the nearest whole number as indicated at block 720.

If the percentage value of the lower priority license type is greater than the percentage value of the higher priority license type then the computer system may check at block 725 to see if the optimal license count of the lower priority license type is greater than or equal to the sum of both license types multiplied by the lower priority license type percentage value. If this condition is met, then at block 730, the recommended license count may be equal to the optimal license count for that license type.

Figure 8:
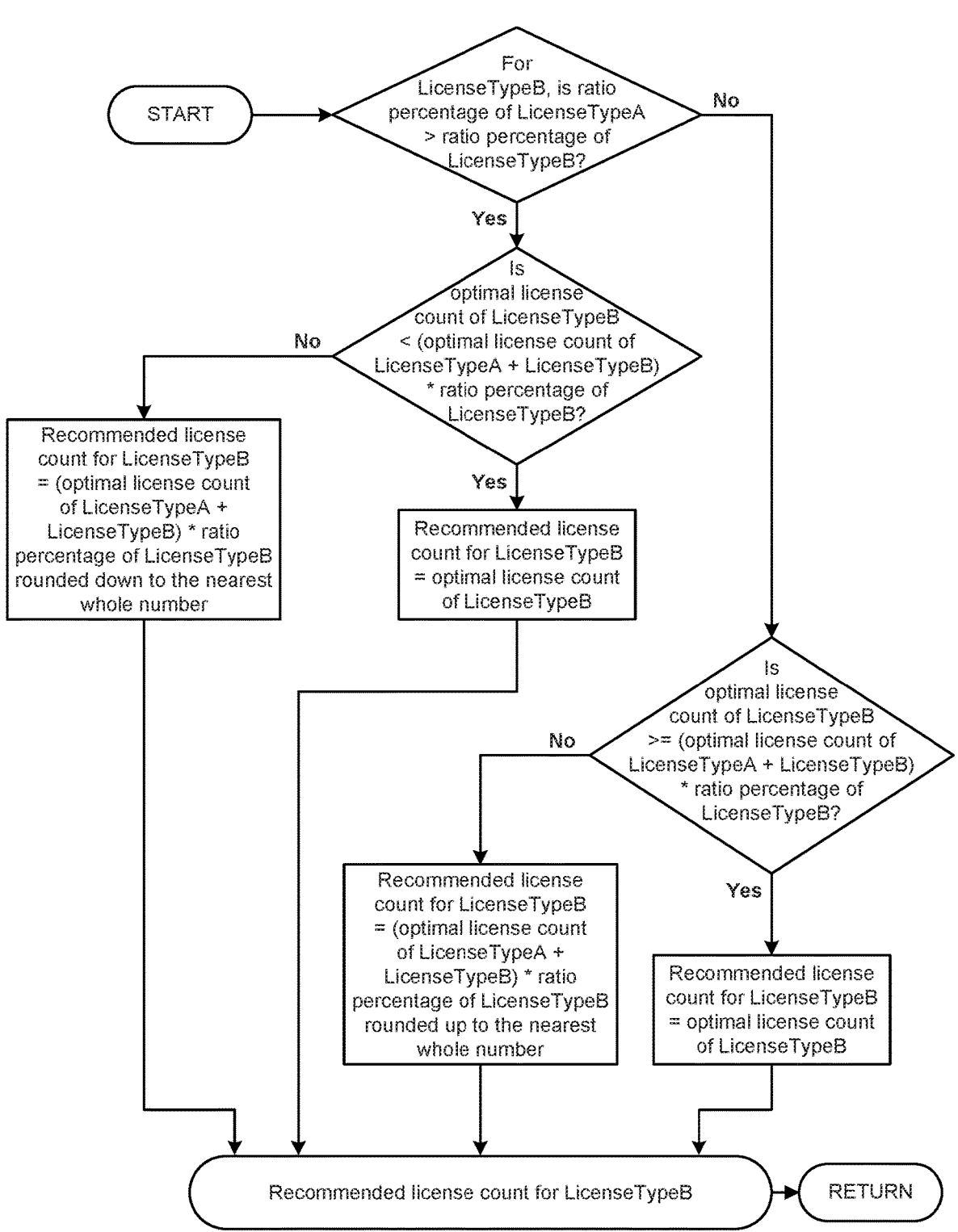
FIG. 8 is a flow diagram depicting various steps in a license recommendation process (e.g., as may occur in block 425 in some embodiments) as may be implemented in some embodiments.

If the condition is not met, then at block 735 the recommended license count may be the sum of both license types multiplied by the lower priority license type percentage value rounded up to the nearest whole number. An analogous process may then be followed for the higher priority license type as indicated in FIG. 8 for block 425. At this point the system may now have the constrained license position, that is, the optimal license position updated to include the constraints of a license ratio.

Figure 4:
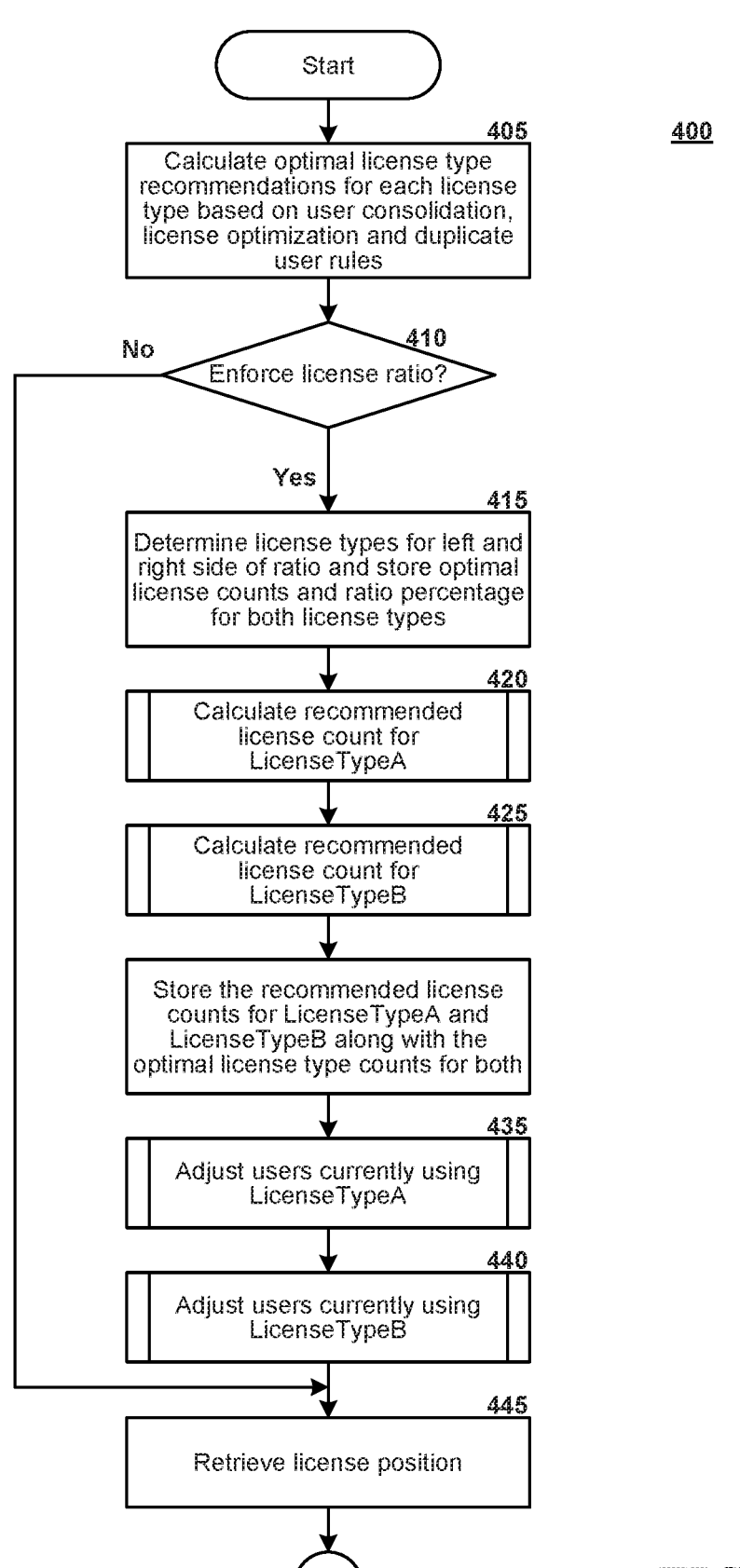
FIGS. 4 and 5 are a flow diagram depicting various steps in a license optimization process as may be implemented in some embodiments.

Returning to the process of FIG. 4, FIG. 9 is a flow diagram depicting various steps in a license update process (e.g., as may occur in block 435 in some embodiments) as may be implemented in some embodiments. FIG. 10 is another flow diagram depicting various steps in a license update process (e.g., as may occur in block 440 in some embodiments for a higher priority license) as may be implemented in some embodiments. The license position may then be retrieved at block 445.

Figure 5:
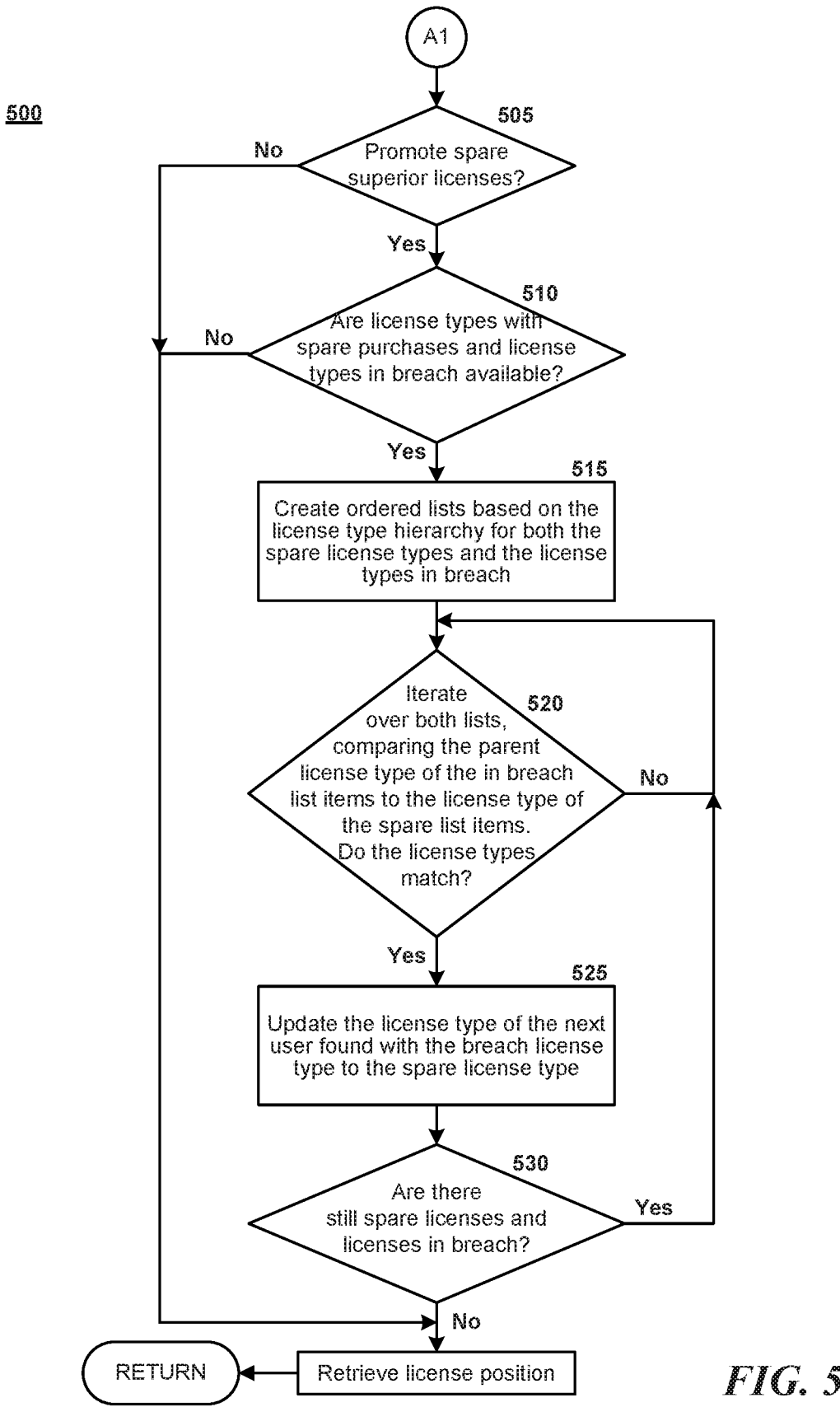

The process of FIG. 4 is continued in FIG. 5, where blocks 505 and 510 the computer system may then determine if any license types that are in breach can be brought back into compliance by using spare licenses of a superior license type. As with license ratios, the system may first check if the option to use spare license purchases is active (e.g., the option may be set by an administrator, by a term in the license database, etc.). If the option is not active, the system may return the current license position.

However, if the option is active, the computer system may then build up two separate lists. One list may contain all license types that have spare licenses available and the other list may contain a list of license types that are in breach. Both lists may then be ordered at block 515 based upon the predefined license type hierarchy, e.g., as defined by the license provider (e.g., SAP®). The system may then iterate through these lists, comparing the parent license type of each item in the breach list to the license type of the items in the spare list. When a match is found the computer system may reassign the first user with the breached license type at block 525 such that they now use the license type of one of the spare licenses. These updates may avoid the need to purchase an extra license. License substitutions may continue until there are either no more spare licenses or all breaches have been removed as determined at block 530. At this point the computer system may return the final license position.

Example Entities

FIG. 6 depicts example entities 600 as may be applied in some embodiments. The "optional license count" may specify the count of licenses without any licensing constraints being taken into consideration. In contrast, the "recommended license count" may reflect the license count with constraints taken into consideration.

User License Adjustment

One will recognize that in all the examples provided herein LicenseTypeA and LicenseTypeB are considered as single licenses for purposes of clarity to facilitate understanding. As discussed, groups of licenses rather than single licenses may be managed, mutatis mutandis, using the systems and methods described herein.

Computer System

Figure 11:
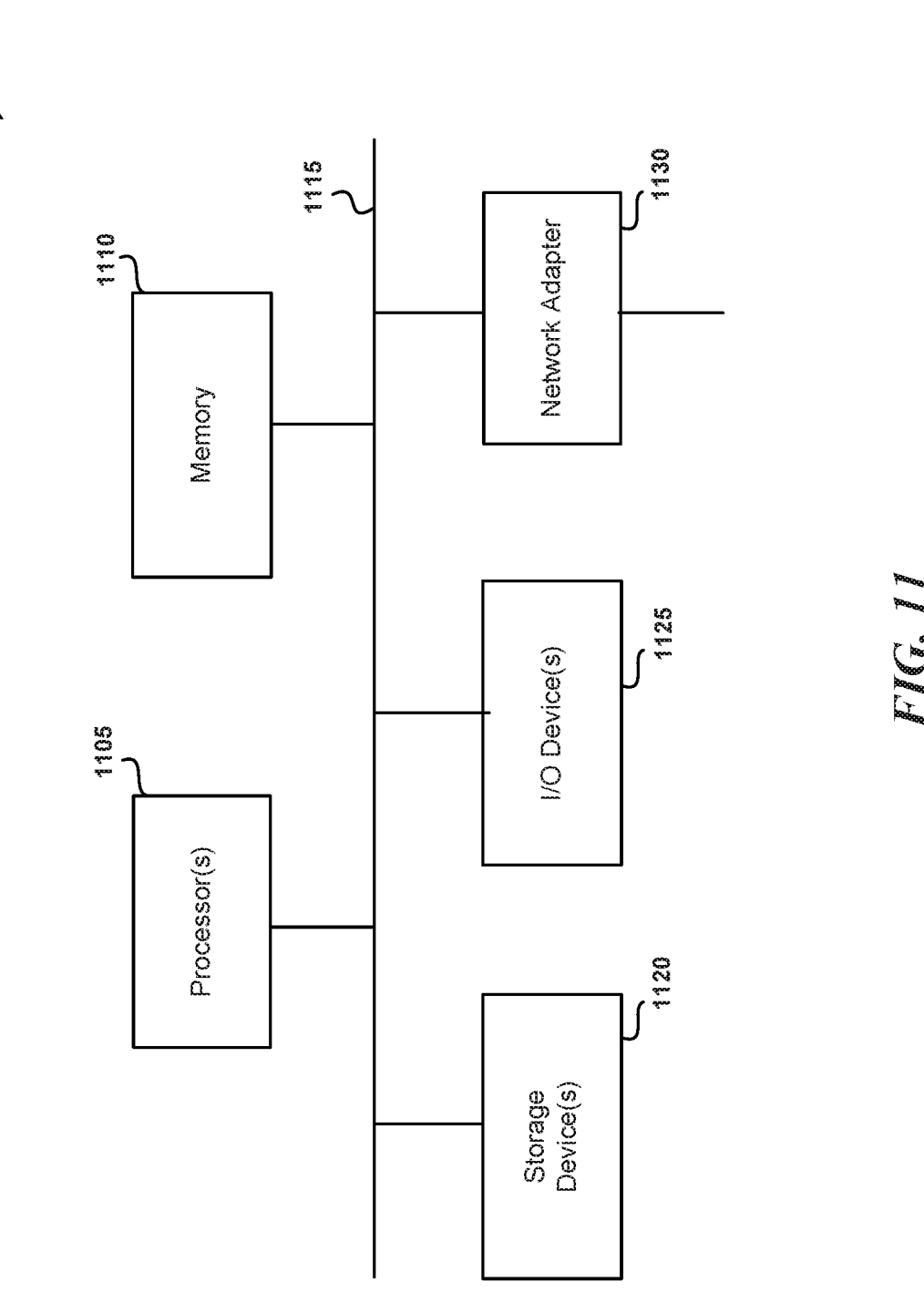
FIG. 11 is a block diagram of a computer system as may be used to implement features of some of the embodiments.

FIG. 11 is a block diagram of a computer system as may be used to implement features of some embodiments. The computing system 1100 may include one or more central processing units ("processors") 1105, memory 1110, input/output devices 1125 (e.g., keyboard and pointing devices, display devices), storage devices 1120 (e.g., disk drives), and network adapters 1130 (e.g., network interfaces) that are connected to an interconnect 1115. The interconnect 1115 is illustrated as an abstraction that represents any one or more separate physical buses, point to point connections, or both connected by appropriate bridges, adapters, or controllers. The interconnect 1115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1110 and storage devices 1120 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 1110 can be implemented as software and/or firmware to program the processor(s) 1105 to carry out actions described above. In some embodiments, such software or firmware may be initially provided to the processing system 1100 by downloading it from a remote system through the computing system 1100 (e.g., via network adapter 1130).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A computer system comprising a processor and a memory storing instructions that, when executed by the processor, cause the computer system to:

obtain, via an application manager included in the computer system, optimization rules customized for an entity, the optimization rules informing assignments of licenses to users based on usage activity associated with a software program, wherein the application manager is configured to receive the usage activity from a central system included in the computer system, and wherein the application manager is configured to derive recommendations based on the optimization rules;

monitor usage activity, via the central system, of a software program being associated with processes/threads actively executing on a plurality of client systems associated with the entity which are connected to the network, wherein the central system is integrated with the network, wherein the central system runs monitoring programs configured to coordinate license assignments for the client systems across the network, and wherein coordinating license assignments includes, at least, transitioning a user engaged in a session under a first license type to a second license type based on closure of instances of the software program by other users;

ascertain, via the application manager based on the monitored usage activity, an existing license ratio between a first group of licenses of the first license type and a second group of licenses of the second license type collectively allocated to the plurality of client systems, each of the first and second license types defining different amounts of functionality enabled by the software program, wherein the second license type has greater priority than the first license type in a hierarchy of license types, and wherein priorities indicated in the hierarchy of license types are customized by a licensor and required to be enforced, wherein enforcing the adjusted allocation comprises building a first list of license types having spare licenses and a second list of license types that are in breach, ordering both lists according to the hierarchy of license types, identifying for a breached license type a spare license of a superior license type that is a parent of the breached license type in the hierarchy of license types, and reassigning a particular client system from the breached license type to the spare license;

determine a breach associated with use of the software program by a first client system assigned the first group of licenses, wherein the first license type is assigned as a breach license type, and wherein the breach indicates a number of the first group of licenses has been exceeded under an expected license ratio which is to be enforced, such that that there aren't enough of the first group of licenses to meet the expected license ratio;

determine, via the application manager in response to the detected breach, a particular recommendation reflecting a first recommended license count for the first group of licenses and a second recommended license count for the second group of licenses based on the monitored usage activity and the expected license ratio between the first and second license types; and cause, via the central system based on the hierarchy of licenses and the particular recommendation from the application manager, adjustment of an allocation of one or more licenses from the second groups of licenses in accordance with the first and second recommended license counts such that the adjusted allocation is in accordance with the monitored usage activity while conforming to the expected license ratio, wherein the adjusted allocation is enforced by the computer system, and wherein to enforce the adjusted allocation for the first client system, the computer system is configured to:

reassign the first client system based on the adjusted allocation, wherein the computer system validates that an administrator has set an option to allow the computer system to automatically reassign client systems based on breaches, wherein the first client system is assigned to the second group of licenses as adjusted in the adjusted allocation, and wherein the first client system is configured to use the software program with an amount of functionality defined by the second license type.

2. The computer system of claim 1 further caused to, prior to monitoring the usage activity:

cause the plurality of client systems to report the usage activity of the software program at the plurality of client systems at various points in time.

3. The computer system of claim 1 further caused to, prior to monitoring the usage activity:

obtain the expected license ratio from a database.

4. The computer system of claim 1 further caused to, when determining the first recommended license count:

determine that the existing license ratio associated with the first license type is greater than the existing license ratio associated with the second license type;

set the first recommended license count to a particular license count for the first license type if the particular license count for the first license type is greater than a particular license count of both the first and second license types times the existing license ratio associated with the first license type; and set the first recommended license count to a sum of the particular license count of the first and second license types times the existing license ratio associated with the first license type if the particular license count of the first license type is less than the particular license count of both the first and second license types times the existing license ratio associated with the first license type.

5. The computer system of claim 4 further caused to, when setting the first recommended license count comprises:

round up the first recommended license count to an integer value.

6. The computer system of claim 1 further caused to, when determining the first recommended license count:

determine that the existing license ratio associated with the first license type is less than the existing license ratio associated with the second license type;

set the first recommended license count to a particular license count for the first license type if the particular license count of the first license type is less than a particular license count of both the first and second license types times the existing license ratio associated with the first license type;

set the first recommended license count to a sum of the particular license count of the first and second license types times the existing license ratio associated with the first license type if the particular license count of the first license type is greater than the particular license count of both the first and second license types times the existing license ratio associated with the first license type.

7. The computer system of claim 6 further caused to, when setting the first recommended license count:

round down the first recommended license count to an integer value.

8. The computer system of claim 1 further comprising:

a server computer of a deployment system, the deployment system including the plurality of client systems, and the server computer including:

a processor; and a memory including instructions that, when executed by the processor of the server computer, causes the processor to:

reallocate the one or more licenses from the second groups of licenses in accordance with the first and second recommended license counts.

9. The computer system of claim 8, wherein the server computer includes the application manager system.

* * * * *